(12) United States Patent
Fatih

(10) Patent No.: US 11,238,452 B2
(45) Date of Patent: Feb. 1, 2022

(54) SIGNATURE SYSTEM FOR VERIFYING A SIGNATURE, AND CORRESPONDING SIGNATURE METHOD

(71) Applicant: Selahattin Fatih, Herford (DE)

(72) Inventor: Selahattin Fatih, Herford (DE)

( * ) Notice: Subject to any disclaimer, the term of this patent is extended or adjusted under 35 U.S.C. 154(b) by 0 days.

(21) Appl. No.: 17/040,688

(22) PCT Filed: Aug. 24, 2018

(86) PCT No.: PCT/EP2018/072842
§ 371 (c)(1),
(2) Date: Sep. 23, 2020

(87) PCT Pub. No.: WO2019/185178
PCT Pub. Date: Oct. 3, 2019

(65) Prior Publication Data
US 2021/0012344 A1 Jan. 14, 2021

(30) Foreign Application Priority Data
Mar. 28, 2018 (DE) .......................... 102018107415.8

(51) Int. Cl.
*G06K 9/00* (2006.01)
*G06Q 20/40* (2012.01)

(52) U.S. Cl.
CPC ..... *G06Q 20/4014* (2013.01); *G06K 9/00154* (2013.01); *G05B 2219/24162* (2013.01)

(58) Field of Classification Search
CPC ........... G06Q 20/4014; G06K 9/00154; G05B 2219/24162; G06F 21/32; G06F 21/35; G06F 21/31; G06F 21/33; H04L 9/3247; H04L 9/3231
USPC ......................................................... 382/116
See application file for complete search history.

(56) References Cited

U.S. PATENT DOCUMENTS

| 9,372,969 | B1 | 6/2016 | Daniel | |
|---|---|---|---|---|
| 2003/0062202 | A1* | 4/2003 | Parry | G06F 21/32 178/18.01 |
| 2005/0207614 | A1* | 9/2005 | Schonberg | G06K 9/00597 382/100 |
| 2009/0123218 | A1* | 5/2009 | Kim | B43K 29/08 401/195 |
| 2011/0320352 | A1 | 12/2011 | Mehew et al. | |
| 2012/0157055 | A1* | 6/2012 | Ren | H04L 63/0853 455/411 |
| 2014/0029811 | A1 | 1/2014 | Delia et al. | |
| 2018/0019987 | A1* | 1/2018 | Pham | H04L 63/08 |
| 2018/0032162 | A1 | 2/2018 | Miryala | |

* cited by examiner

*Primary Examiner* — Stephen P Coleman
(74) *Attorney, Agent, or Firm* — Richard M. Goldberg

(57) ABSTRACT

A signature system for verifying a signature, includes a writing device which is equipped with identification devices for determining identification data which are linked to the identity of an user of the writing instrument, and code generating devices for generating an identification code from the identification data and from further data, the writing device further including display devices for displaying the identification code; as well as a corresponding signature method.

23 Claims, 2 Drawing Sheets

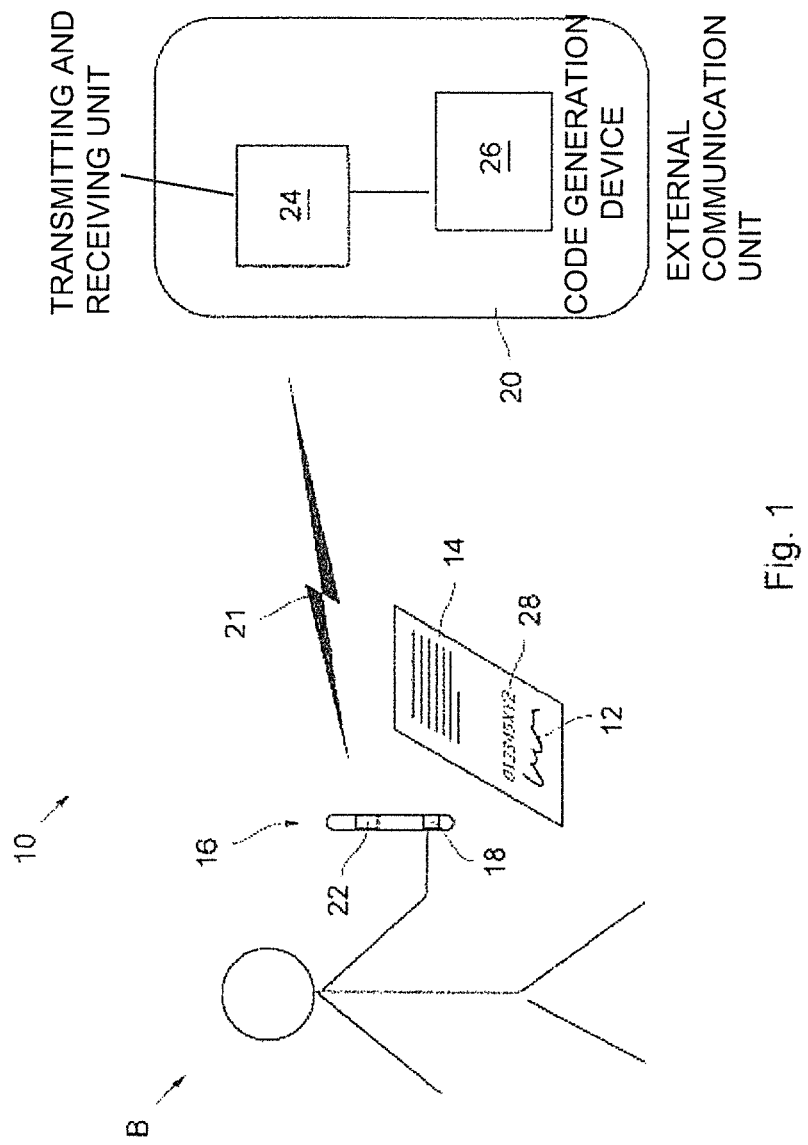

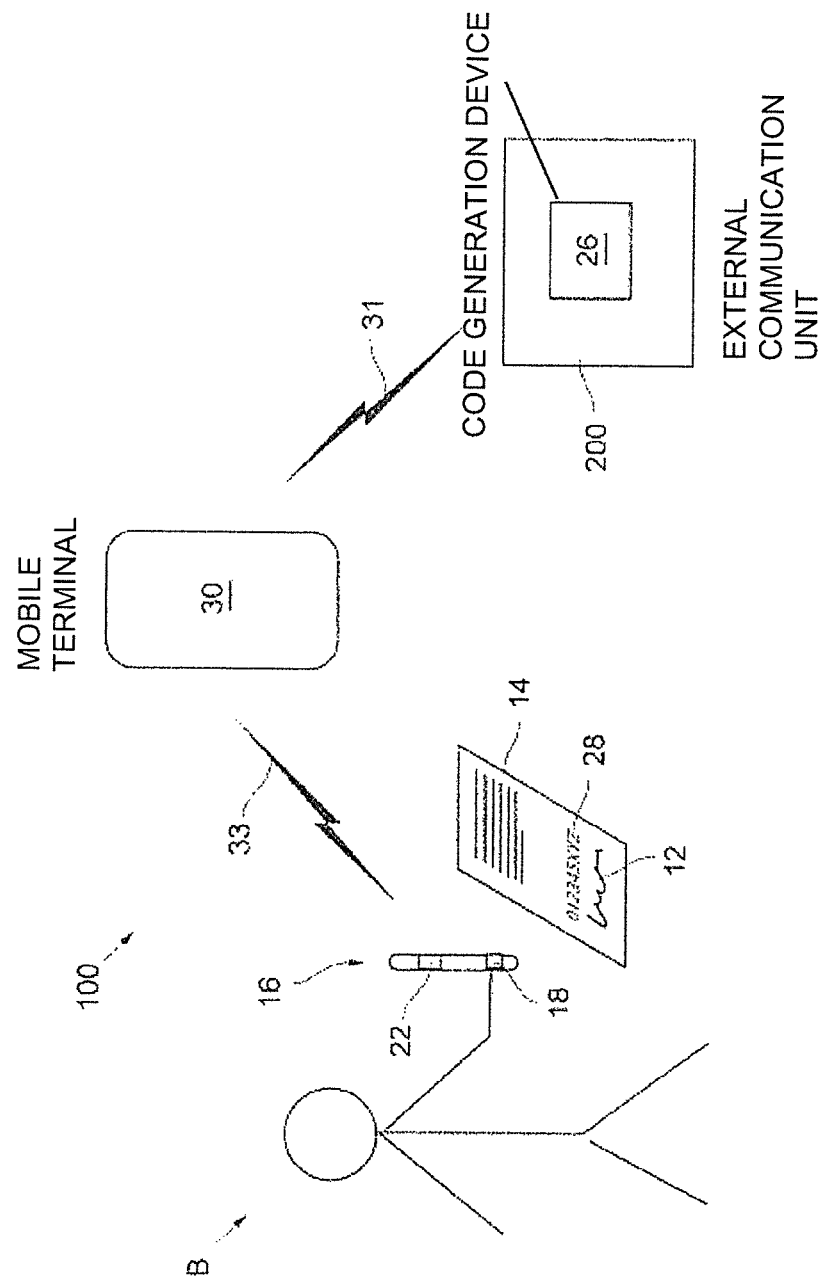

SIGNATURE SYSTEM FOR VERIFYING A SIGNATURE, AND CORRESPONDING SIGNATURE METHOD

BACKGROUND OF THE INVENTION

The present invention concerns a signature system for verifying a signature and a corresponding signature method.

Signature systems and corresponding methods have long existed in varying embodiments, which have been adapted to, in particular, technical progress in the field of telecommunications. Such systems basically solve the problem of verifying the identity of a user making an input which only an authorised user is permitted to make. Inputs by unauthorised users are not accepted, or at least not recognised by the system. Such systems have particular significance with respect to financial transfers, for online banking for example, or internet payment systems. To complete a transaction the user is required to enter e.g. a personal identification number or similar, only available to him as the unique user, which is verified by the recipient. We will not go into further details of such systems and methods here as they are known in themselves.

Verifying a handwritten signature inscribed on a document poses a particular problem. In a legal context, such a handwritten signature may serve as proof that the person signing has noted the content of the document signed, or is the author of the document. This system, which is far older than the aforementioned electronic signature systems, is based on the perception that a person's signature is something individual which can only be forged with great skill and effort.

Such forgery cannot be entirely avoided, however. Given that the system is essentially paper-based, it is difficult to improve without additional effort by the persons involved, i.e. the user or recipient of the document.

SUMMARY OF THE INVENTION

In view of the aforementioned problems, it is therefore a task of the present invention to provide a signature system for verification of a signature which is an improvement on the long known paper-based method of signing, to render it more secure without necessitating substantially more effort.

This task is solved according to the invention by a signature system with the features of the claims, and by a corresponding signature method according to the claims.

With the signature system according to the invention, a writing instrument operated by hand, such as a pen or similar, is available to the user, i.e. the signing person. The purpose of the writing instrument is to execute a signature on a document by hand, in the conventional manner. Furthermore, the writing instrument according to the invention is equipped with identification devices for the purpose of collecting identification data associated with the identity of the user of the writing instrument. This enables the writing instrument to recognise the user. Various types of identification devices are conceivable for this purpose, to be chosen as appropriate, and which comprise the subject-matter of various embodiments of the present invention. They may comprise input devices, for example, into which the user enters personal data known only to him such as a personal access code, a personal identification number or similar, or sensors provided to collect data permitting unambiguous ascertainment of the user's identity.

With these user-specific identification data, an identification code can be generated which is then displayed by the writing instrument itself by means of suitable display devices such as a display or similar. The user can read the identification code which is displayed and copy it onto the document to be signed using the writing instrument. The document then carries a signature plus the generated identification code. This serves as additional proof that the signature was executed by someone identified by the identification devices of the writing instrument.

The security of the system and method according to the invention is enhanced in that, besides the signature itself, the document also carries the identification code generated using the identification data associated with the user of the writing instrument, as well as additional other data not easily available to either the user or third parties. These other data may for example furnish a guarantee that the identification data were collected at a certain time in a certain location, thereby preventing the identification code from being noted on the document at a later time.

According to one preferred embodiment of the signature system according to the invention, the additional data comprise chronological data and/or location data indicating a time and a position of the writing instrument. The chronological and location data can be linked to each other and used to reliably indicate the time and location of use of the writing instrument. These latter, plus the identification data, can be used to generate an identification code containing information indicating that a certain user (designated by the identification data) used the writing instrument at a certain time in a certain location.

According to another preferred embodiment of the signature system the additional data comprise a key which is stored in the code generating devices or can be transmitted to them.

This key is not stored publicly, but in a hidden inaccessible location. This ensures that third parties cannot generate the identification code solely on the basis of falsified identification data or using falsified chronological and/or location data.

Further, the identification devices are preferably provided for the purpose of detecting an access code to be entered by the user. The access code may be, for example, a personal identification code or similar, known only to the user.

Further, the identification devices are preferably provided to detect biometric features of the user. In this case, active input of an access code or similar by the user is not required.

In this case, according to a preferred embodiment of this signature system, the identification devices comprise a fingerprint scanner. For example, an embodiment is conceivable in which the fingerprint scanner is positioned on a part of the writing instrument on which one of the user's fingers rests when writing.

According to another embodiment of the invention, the identification devices comprise an iris scanner.

According to another embodiment of the invention, the code generation devices are incorporated within the writing instrument. They may comprise a chip, for example, which is incorporated in the body of the writing instrument. Although the identification devices and the code generating devices are referred to using different terminology in the present description and the patent claims, the object of the invention also includes signature systems in which the identification devices and the code generation devices are materialised by the same unit.

The signature system according to the invention further preferably comprises an external communication unit incorporating the code generation devices, and communication means for transmitting the identification data from the writing instrument to the external communication unit and for retransmitting the generated identification code back to the writing instrument. In the present case, the code generation devices in which the identification code is generated are located outside the writing instrument and disposed at a distance from it. Embodiments are conceivable in which one external communication unit is available to several writing instruments, performing separate verification processes for each one, i.e. receives the corresponding identification data and retransmits individual identification codes back to the writing instruments.

The communication means are preferably wireless communication means.

The communication means further preferably comprise a mobile terminal equipped to communicate with the writing instrument on the one hand and with the external communication unit on the other. In this way, devices required to establish a remote connection with the external communication unit can be located within the mobile terminal, for example, which can in turn establish a near-field communication with the writing instrument. This can offer the advantage that the writing instrument itself may be of a less complex design, and the signature system according to the invention may be made using components which are readily available in conventional mobile terminals. One could conceivably use a conventional mobile telephone or tablet computer as the mobile terminal, for example.

In this case, the mobile terminal is preferably equipped to communicate with the writing instrument via a near-field communication transmission standard and to communicate with the external communication unit via a mobile telecommunication transmission standard. The near-field communication transmission standard may be the Bluetooth standard for example, whereas the mobile telecommunication transmission standard may be a widely used standard such as LTE or similar, for example.

According to another preferred embodiment of the present invention, the external communication unit comprises a mobile terminal. That means that in this embodiment, the mobile terminal itself includes the code generation devices.

The external communication unit further preferably comprises a memory for saving the identification code and/or identification data.

The writing instrument is preferably a pen. In this case, the writing instrument thus has the usual and generally known functions of a pen to permit the inscription of a signature on a document such as a sheet of paper, but, beyond that, also includes other components for realising the signature system according to the invention, in particular the identification devices described above.

The present invention further concerns a signature method for verifying a signature, comprising the following steps:
  inscription of a signature on a document using a writing instrument,
  identification of the user of the writing instrument by the writing instrument,
  generation of an identification code from identification data associated with the identity of the user, and from other data,
  display of the identification code by the writing instrument
  recording of the identification code on the document.

According to a preferred embodiment of this signature method, the other data comprise chronological data and/or location data indicating a time and a position of the writing instrument.

The other data further comprise a key which is stored in devices which generate the identification code or can be transmitted to them.

Further, the user is preferably identified by an access code to be entered by him.

Further, the user is preferably identified by biometric features.

According to another embodiment of the present signature method, the identification code is generated by the writing instrument.

According to another embodiment of the signature method of the invention, the identification code is generated by an external communication unit to which the identification data are transmitted from the writing instrument, and which retransmits the generated identification code back to the writing instrument. In this case, the identification data are preferably transmitted via a mobile terminal to the external communication unit, and the identification code is transmitted back to the writing instrument via this mobile terminal.

According to an alternative embodiment of the signature system of the invention, the external communication unit is itself a mobile terminal.

Further, the identification code and/or identification data are preferably stored in the external communication unit.

BRIEF DESCRIPTION OF THE DRAWINGS

Preferred embodiments of the present invention are described in more detail below with reference to the drawings.

FIGS. 1 and 2 are diagrammatic representations of a first embodiment and a second embodiment of the signature system according to the invention.

DETAILED DESCRIPTION

The signature system 10 shown in diagrammatic form in FIG. 1 serves to verify a signature 12 on a document 14. Signature 12 is created by a user B with the aid of a writing instrument 16, which user B guides and operates by hand. Accordingly, writing instrument 16 is a pen which, beyond the conventional writing functions of a pen, has other functions and components which are part of the signature system 10 and will be described in more detail below. Document 14 is content which is printed on a sheet of paper, for example.

Writing instrument 16 comprises identification devices for collecting identification data associated with the identity of user B of writing instrument 16. This association is unambiguous, thereby permitting definite and individual identification of user B by means of his identification data. In the present embodiment of signature system 10, the identification devices comprise a fingerprint scanner 18. This fingerprint scanner 18 captures a fingerprint of user B and determines the identification data on this basis. Fingerprint scanner 18 may be disposed in a position on writing instrument 16 where a finger of user B will normally rest when using writing instrument 16 during the process of writing. Hence the fingerprint can be automatically scanned as writing instrument 16 is used without any additional action. The identification devices may also detect other biometric features of user B. The identification devices may, for example, comprise an iris scanner provided for the purpose of scanning the iris of one eye of user B and determining the identification data on this basis. Alternatively, the identification devices may be provided for the input or collection of an access code to be entered by the user. This access code may be a personal identification number (PIN), for example.

The identification data thus obtained are wirelessly transmitted to an external communication unit 20. In this case, this external communication unit 20 is a mobile terminal such as a mobile telephone. Communication may take place using a near-field connection 21, for example, according to a near-field communication transmission standard such as Bluetooth. The writing instrument 16 is equipped with a transmitting and receiving unit 22 for this purpose. A corresponding transmitting and receiving unit 24 is incorporated in the mobile terminal.

The identification data obtained are thus transferred wirelessly from the transmitting and receiving unit 22 of writing instrument 16 to the transmitting and receiving unit 24 of external communication unit 20 and forwarded internally to code generation devices 26 for generation of an identification code. This identification code is generated from the identification data and other data. These other data may be, in particular, chronological data and/or location data indicating a time and position of writing instrument 16 at that particular moment. That means, in this case, the chronological data and location data indicate where writing instrument 16 was located at a specific time. That may be the time at which the identification data were collected, so that the chronological data and location data may also be used to verify that a certain person B, to whom the identification data relate, did indeed use the writing instrument at that specific time. The chronological data may be obtained by a clock, for example, which is incorporated in writing instrument 16. The location data may be obtained by a positioning system inside writing instrument 16, which communicates with the Global Positioning System (GPS). The chronological data and location data can then be transmitted to the external communication unit 20 together with the identification data.

Alternatively, or additionally, it is also possible that the other data used to generate the identification code, comprise a key which is secret and, in particular, cannot be read from writing instrument 16. The key may be stored in the external communication unit 20, for example, in code generation devices 26 or in a memory connected to them, so that they can be transmitted to code generation devices 26.

Code generation devices 26 generate an identification code which is transmitted back to writing instrument 16 via the transmitting and receiving unit 24 of external communication unit 20 and is displayed for user B to see. Writing instrument 16 is equipped with corresponding devices, e.g. a display, for this purpose. Hence user B can read the identification code and record it on document 16. Identification code 28 is then documented on document 14 together with signature 12.

According to another embodiment not shown in the drawings, code generation devices 26 are not integrated inside an external communication unit but rather inside writing instrument 16 itself. The process of obtaining the identification data, of generating an identification code from the identification data and from other data such as chronological data and/or location data, and possibly a key, and of displaying the identification code 28, is then performed entirely by writing instrument 16.

In the embodiment of a signature system 100 according to the invention shown in FIG. 2, writing instrument 16 is identical to the first embodiment of signature system 10 in FIG. 1 and comprises identification devices to obtain identification data of a user B and transmitting and receiving devices 22 for wireless transmission of the identification data at least to a mobile terminal 30. In the present case, mobile terminal 30 is designed to retransmit the data received from writing instrument 16 to an external communication unit 200. This external communication unit 200 may be disposed in a location distant from writing instrument 16 and mobile terminal 30, and is wirelessly remote-connected with mobile terminal 30. This remote connection 31 may be established via a mobile telecommunication transmission standard, whilst the mobile terminal 30 is connected with writing instrument 16 via a near-field communication transmission standard. The transmitting and receiving unit of the mobile terminal 30 therefore serves the purpose of forwarding data received from writing instrument 16 to the external communication unit 200. This latter incorporates the code generation devices 26 for generating the identification code 28 from the identification data and other data. As in the previous embodiment examples, these other data may comprise chronological data and/or location data to indicate a time and/or position of writing instrument 16. Further, these data may comprise a key which is saved either in the code generation devices 26 of the external communication unit 200 or in another location, so that the key can be transmitted to the code generation device 26.

The identification code 28 generated is transmitted from the external communication unit 200 back to the mobile terminal 30 and then from this latter, via a near-field connection 33 in accordance with a near-field communication transmission standard, to writing instrument 16, where it can be displayed to user B, who can then record it on document 14.

The present embodiment therefore involves an externalisation of the external communication unit 200 to a location at a distance from mobile terminal 30, which may be positioned in the immediate proximity of user B. The identification code 28 is therefore generated outside the sphere of access of user B.

The generation of identification code 28 may be accomplished in all above-described embodiments by means of a secret algorithm.

The signature 12 of a user B on document 14 may thus be verified according to the following method. First, user B inscribes his signature on document 14 using writing instrument 16. Further, user B is identified by writing instrument 16. This identification may be performed immediately before, during or immediately after signature 12 is inscribed.

Identification code 28 is generated using the identification data associated with the identity of user B and from other data. This generation is performed in code generation devices 26 which, depending on the embodiment, are located in writing instrument 16, in a mobile terminal serving as an external communication unit 20, or in an external communication unit 200 remote from a mobile terminal 30, which is disposed as a connecting relay between writing instrument 16 and the external communication unit 200. With respect to the other data used to generate identification code 28, they may be, for example, chronological data and/or location data indicating a time and/or a position of writing instrument 16. A key which can be transmitted to the code generation device 26 or saved in it, but is not publicly accessible, may also be used as the other data.

What is claimed is:

1. A signature system for verifying a signature comprising:
   a writing instrument equipped with an identification device for identifying identification data connected with the identity of a user of the writing instrument, and a code generation device for generating an identification code from the identification data and from other data, said writing instrument further comprising a display device for displaying the identification code, an external communication unit inside which the code generation device is integrated, and a communication device for transmitting the identification data from the writing instrument to the external communication unit and for retransmitting the generated identification code to the writing instrument.

2. A signature system according to claim 1, wherein the other data comprise:
chronological data,
location data or
both chronological data and location data, indicating a time and a position of the writing instrument.

3. A signature system according to claim 1, wherein the other data comprise a key which is one of:
stored in the code generation device, or
adapted to be transmitted to the code generation device.

4. A signature system according to claim 1, wherein the identification device is provided to identify an access code entered by the user.

5. A signature system according to claim 1, wherein the code generation device is integrated inside the writing instrument.

6. A signature system according to claim 1, wherein the external communication unit comprises a mobile terminal.

7. A signature system according to claim 1, wherein the external communication unit comprises a memory for saving one of:
the identification code,
the identification data or
both the identification code and the identification data.

8. A signature system according to claim 1, wherein the writing instrument is a pen.

9. A signature system according to claim 1, wherein the identification device is provided to identify biometric features of the user.

10. A signature system according to claim 9, wherein the identification device comprises a fingerprint scanner.

11. A signature system according to claim 9, wherein the identification device comprises an iris scanner.

12. A signature system according to claim 1, wherein the communication device is a wireless communication device.

13. A signature system according to claim 12, wherein the communication device comprises a mobile terminal equipped to communicate with the writing instrument on the one hand, and with the external communication unit on the other.

14. A signature system according to claim 13, wherein the mobile terminal is equipped to communicate with the writing instrument via a near-field communication transmission standard and to communicate with the external communication unit via a mobile telecommunication transmission standard.

15. A signature method for verifying a signature, comprising the following steps:
creation of a signature using a writing instrument on a document,
identification of a user of the writing Instrument by the writing instrument,
generation of an identification code from identification data connected with the identity of the user, and from other data,
display of the identification code by the writing instrument, and
recording of the identification code on the document,
wherein the identification code is generated by the writing instrument.

16. A signature method according to claim 15, wherein the other data comprise:
chronological data,
location data or
both chronological data and location data, indicating a time and a position of the writing instrument.

17. A signature system according to claim 15, wherein the other data comprise a key which is one of:
stored in a device which generates the identification code, or
adapted to be transmitted to the device which generates the identification code.

18. A signature method according to claim 15, wherein the user is identified by an access code entered by him.

19. A signature method according to claim 15, wherein the user is identified by biometric features.

20. A signature method for verifying a signature, comprising the following steps:
creation of a signature using a writing instrument on a document,
identification of a user of the writing Instrument by the writing instrument,
generation of an identification code from identification data connected with the identity of the user, and from other data,
display of the identification code by the writing instrument, and
recording of the identification code on the document,
generating the identification code by an external communication unit, to which the identification data are transmitted from the writing instrument, and which retransmits the generated identification code back to the writing instrument.

21. A signature method according to claim 20, further comprising the steps of:
transmitting the identification data via a mobile terminal to the external communication unit, and
transmitting the identification code back to the writing instrument via this mobile terminal.

22. A signature method according to claim 20, wherein the external communication unit is itself a mobile terminal.

23. A signature method according to claim 20, further comprising the step of storing one of the following in the external communication unit:
the identification code,
the identification data or
both the identification code and the identification data.

* * * * *